United States Patent [19]

Riha

[11] Patent Number: 5,119,594
[45] Date of Patent: Jun. 9, 1992

[54] GRINDING MACHINE FOR CONTINUOUS ROLL GRINDING OF GEARS

[75] Inventor: Werner Riha, Passau, Fed. Rep. of Germany

[73] Assignee: Zahnradfabrik Friedrichshafen AG, Fed. Rep. of Germany

[21] Appl. No.: 449,889

[22] PCT Filed: Jun. 8, 1988

[86] PCT No.: PCT/EP88/00505

§ 371 Date: Dec. 8, 1989

§ 102(e) Date: Dec. 8, 1989

[87] PCT Pub. No.: WO88/09706

PCT Pub. Date: Dec. 15, 1988

[30] Foreign Application Priority Data

Jun. 13, 1987 [DE] Fed. Rep. of Germany ....... 3719865

[51] Int. Cl.⁵ .................... B23F 5/04; B23F 23/12
[52] U.S. Cl. .................... 51/52 R; 51/95 GH; 51/105 GG; 51/287; 51/288; 409/18; 409/22
[58] Field of Search ........... 51/287, 26, 52 R, 52 MB, 51/95 R, 95 GH, 95 LH, 95 TG, 105 GG, 105 HB, 288; 409/12, 19-24, 35-37, 49

[56] References Cited

U.S. PATENT DOCUMENTS

| | | | |
|---|---|---|---|
| 1,759,333 | 5/1930 | Wildhaber . | |
| 1,879,196 | 9/1932 | Greene | 409/23 X |
| 3,200,711 | 8/1965 | Rogg | 51/95 GH |
| 3,232,169 | 2/1966 | Bradner | 409/19 |
| 3,453,931 | 7/1969 | Campbell | 409/19 |
| 3,487,584 | 1/1970 | Rickenmann . | |
| 3,717,958 | 2/1973 | Ellwanger | 51/26 |
| 3,740,899 | 6/1976 | Sorokovsky et al. | 51/26 |
| 3,813,821 | 6/1974 | Takahoshi | 51/26 |
| 3,877,176 | 4/1975 | Kotthaus | 51/95 GH |
| 3,992,937 | 11/1973 | Jaeger | 51/26 |
| 4,195,446 | 4/1980 | Angst | 51/165.71 |
| 4,559,744 | 12/1985 | Wirz | 51/165.77 |
| 4,606,682 | 8/1986 | Miller | 409/21 X |
| 4,635,404 | 1/1987 | Wirz | 51/165.77 |
| 4,765,095 | 8/1988 | Weiner | 51/287 |
| 4,799,337 | 6/1989 | Kotthaus | 51/287 |

FOREIGN PATENT DOCUMENTS

| | | |
|---|---|---|
| 2744562 | 4/1979 | Fed. Rep. of Germany . |
| 2934754 | 3/1982 | Fed. Rep. of Germany . |
| 3150961 | 9/1982 | Fed. Rep. of Germany . |
| 451658 | 5/1968 | Switzerland . |

*Primary Examiner*—Bruce M. Kisliuk
*Assistant Examiner*—John A. Marlott
*Attorney, Agent, or Firm*—Davis, Bujold & Streck

[57] ABSTRACT

A grinding machine for continuous roll grinding of gears having a workpiece (6) clamped on a bench (1) and a grinding worm (8), the rotary drives of which are connected by a play-free mechanical hypoid transmission. The grinding worm (8) is continuously dressed during a processing operation. The coordination of grinding worm coils and gear spaces is specially simple and clear and such a roll grinding machine is thereby suited to be automatically loaded.

2 Claims, 1 Drawing Sheet

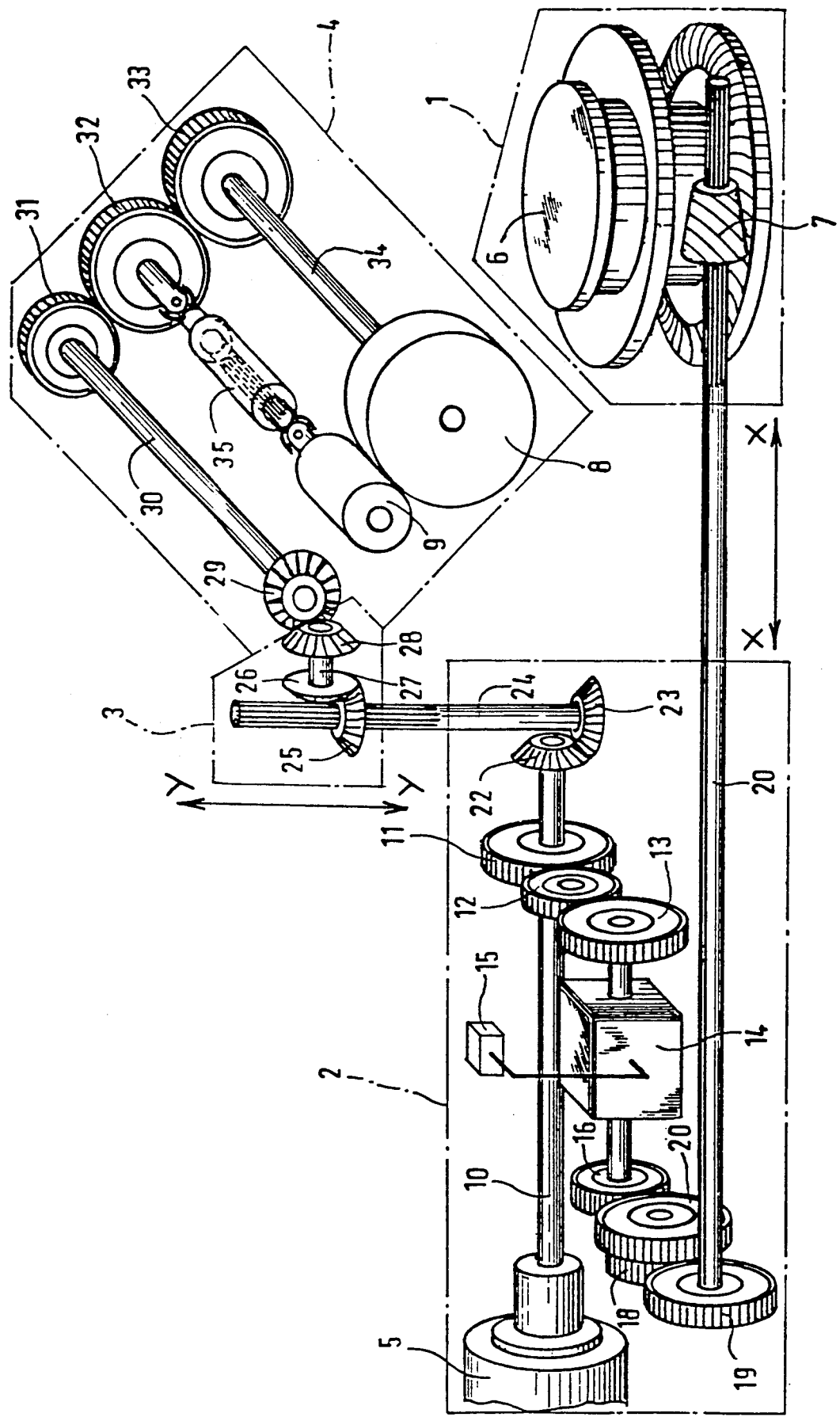

GRINDING MACHINE FOR CONTINUOUS ROLL GRINDING OF GEARS

The invention concerns a grinding machine for continuous roll grinding of gears.

A high-quality is the precondition for high efficiency in gears, high transmission precision, high power-load ratio, high carrying capacity and low noise development. The hardening of gears leads on one hand, to higher carrying capacity of the tooth flanks, but, on the other hand, produces distortion. For this reason continuous roll grinding has been increasingly used for some time in the finishing of gears, even large gears, since thereby can be obtained the desired gear quality after hardening. In addition this permits tooth flanks to be ground for correct profile.

The normal roll grinding machines used at present in production make the grinding process very time consuming and costly.

Already known is a process for continuous roll grinding of Reisshauer AG (Forschungsvereinigung Antriebstechnik, 1979, Increase of Efficiency of the Tooth Flank Grinding Process, pages 7 ff.).

In this process the tool is a grinding worm having a precise rack and pinion profile.

The grinding worm and the gear are each driven by a separate synchronous reaction motor. The involute shape of the tooth flank is produced by the rolling off of the grinding worm and the gear. During the up and down movement of the workpiece carriage the workpiece is ground. The grinding worm is gradually blocked up at the upper and lower reversal points. The advance of the grinding worm can be continuously adjusted within fixed limits. The grinding process develops continuously. It is not interrupted by any partial operations.

In order to make fresh grinding zones mesh with the gear, the grinding worm is guided along its axis of rotation past the gear. The grinding worm can be dressed by means of two rotating discs having a diamond coating or two separate diamonds after the whole of the grinding worm has been traversed, that is, when the grinding worm has been guided along its axis of rotation past the gear. The dressing of the grinding worm is very important in relation to the processing expenses during the loading periods.

The problem to be solved by the present invention is to reduce the time of processing and the cost for the continuous roll grinding of a gear and to create a precondition for an automatic loading of a roll grinding machine.

According to the invention this problem is solved by a transmission that connects, without play, a spiral toothed hypoid drive for the workpiece and a rotary drive for a grinding worm and that the grinding worm is continuously dressed during the grinding operation.

With these measures there is obtained a simple and clear coordination of the position of grinding worm and gear, thus creating an essential precondition for the automatic loading of a roll grinding machine. Since the gear is connected without play with the grinding worm by a mechanical transmission, there is a clear coordination between a clamping fixture of the gear and the grinding worm. Due to the continuous dressing of the grinding worm during the continuous roll grinding operation, the grinding worm constantly meshes with fresh grinding zones in the gear to be ground, and the grinding worm no longer needs to be fully traversed and, as a result, the coordination of the position of the grinding worm with the position of the gear is substantially simplified.

There has been disclosed a gear processing method (Swiss 650183) having a common drive for the tool and the workpiece. The invention proposes a transmission between a spiral toothed hypoid drive of the workpiece and a tool drive in order to make possible the transmission of the high speeds of 1,900 r.p.m. occurring in the continuous roll grinding.

Since in addition the full traverse of the grinding worm has been eliminated as result of the continuous dressing and the extension of the grinding worm along its axis of rotation can be substantially less, advantages are obtained for a rotation of the grinding worm and thus for processing precision in the continuous roll grinding.

The operation of a small grinding worm, which preserves without interruption its speed during the automatic processing operation, is substantially more economical than the operation of a grinding worm weight which must be adjusted and again accelerated each time an operator introduces a new gear, since regulations for the prevention of accidents require that the grinding worm be stopped when there is maintenance by the personnel of the roll grinding machine.

The angular position of the gear spaces of an automatically fed gear relative to the coils of the grinding worm is preferably adjusted by a positioning device in the form of a positioning finger which, for example, is electrically actuated. Such positioning devices are known per se. The process for continuous roll grinding of a gear is then possible without any intervention by an operator.

An advantageous embodiment of the invention is to be seen in the mechanical connection of the drive of the equally worm-shaped diamond-faced dressing tool with the drive of the grinding worm. The transmission between the drive of the grinding worm and the drive of the dressing tool can be planned in a manner such that the dressing tool rotates in the direction opposite to the grinding worm. The dressing tool is preferably situated perpendicularly over the axis of rotation of the grinding worm so that the dressing tool carries out together with the grinding worm, via a strong connection, feeding movements of the grinding worm to the workpiece and the only degree of freedom the dressing tool has is radial in relation to the grinding worm in order continuously to dress the grinding worm during the grinding operation.

A process for continuous roll grinding of gears according to this invention is quicker and more precise, creates the precondition for the full automation of the operation, and limits the task of the personnel to purely supervisory functions.

The invention is not limited to the combination of features of the claims. Other possible logical combinations result for the expert from the claims and individual feature of the claims based on the stated problem.

An embodiment of the invention is illustrated in the drawing.

The apparatus for continuous roll grinding consists of four groups of components:

A. A bench 1 with the clamped workpiece 6 and the spiral toothed hypoid drive 7;

B. A machine upright 2 with the drive motor 5 and transmission members;

C. Grinding carriage 3 with bevel gear group;

D. Grinding wheel assembly 4 with the grinding worm 8, the dressing tool 9 and transmission members.

DESCRIPTION OF THE CONSTRUCTION

A motor 5 drives a spiral direction differential 14 via a shaft 10 and three spur gears 11, 12, 13. An NC-control unit 15 controls the spiral direction differential 14 and changes the rotation at the output 16 of the spiral direction differential 14. Four gear wheels 16, 17, 18, 19 transmit the speed at the output of the spiral direction differential 14 to the telescopic shaft 20. The ratio of transmission of the wheels 16, 17, 18, 19 depends on the speed of the grinding worm 8 and on the number of teeth of the workpiece 6. A spiral toothed hypoid drive 7 provides an almost play-free mechanical connection of the bench 1 and the workpiece 6 clamped thereon with the telescopic shaft 20. A positioning finger (not shown), which can be actuated electrically, mechanically, or by fluid, is firmly connected with the bench 1 and is disposed in a manner such that it can mesh between two teeth of the workpiece 6 to be processed and bring a gear space into position with the grinding worm coils prior to the workpiece 6 being tightly clamped on the bench 1.

A motor 5 drives a group of bevel gears via bevel gears 22, 23 and a vertical shaft 24. The group of bevel gears consists of two intermeshing bevel gears 25, 26 with axes perpendicular to each other and is connected via a shaft 27 with two other bevel gears 28, 29 likewise intermeshing with lines of action perpendicular to each other. A bevel gear 29 passes on the rotary motion, via a shaft 30, to the spur gears 31, 32, 33. The speeds of rotation of the spur wheels 31, 32, 33 depend on the transmission ratio determined by the number of their teeth. The spur gear 33 is connected with the grinding worm 8 via a rigid shaft 34. The spur gear 32 is connected with the dressing tool 9 via a swiveling telescopic shaft 35 which is preferably swiveled with NC control.

DESCRIPTION OF OPERATION

All movements needed for the continuous roll grinding of the workpiece 6 are carried out by the grinding worm 8. The movements are preferably NC-controlled. The bench 1 remains stationary. The movements that the grinding worm 8 effects for processing a workpiece 6 are divided in three components:

X. Translation radially in relation to the workpiece;

Y. Translation parallel with the axis of the workpiece;

Z. Rotation relative for the grinding of helical gearings.

The translation of the grinding worm radially in relation to the workpiece is carried out by the machine upright 2, the grinding wheel assembly 4 and the grinding carriage 3 all together. For this purpose the spiral toothed hypoid drive 7 is movable on the shaft 20. The vertical movement parallel with the axis of the workpiece of the grinding wheel assembly 4 and the grinding carriage 3 relative to the machine upright 2 and the bench 1 guides the grinding worm 8 along the gear flank. For this purpose the bevel gear 25 is movably placed on the vertical shaft 24. The rotation of the grinding worm 8 is carried out by the grinding wheel assembly 4 relative to grinding carriage 3, machine upright 2 and bench 1.

The grinding worm 8 is driven by the motor 5 at about 1,900 r.p.m.

After being introduced, preferably automatically, to the bench 1, the workpiece 6 is first positioned prior to being tightly clamped in the bench 1. A positioning finger 21, which is situated in a defined position on the bench 1 and rotates with the workpiece 6, corrects the position of the workpiece 6 after having been introduced in the machine upright 1 so that the tooth spaces can mesh with the coils of the grinding worm. The spiral toothed hypoid drive 7 of the bench 1 is movably connected with the machine upright 2 via a telescopic shaft 20 in order to introduce the coils of the winding worm in the spaces without changing the position of the hypoid drive 7 relative to the bench 1. The spiral direction differential 14 superimposes, using an NC-control unit 15, on the rotary motion of the bench 1, a forward and backward motion, along line X—X of FIG. 1, depending on parameters of the geometry of the tooth flanks to be ground.

The spiral direction differential 14 allows driving the bench 1 in a manner such that the helical gearings can be ground.

The grinding worm 8 is continuously dressed during the continuous roll grinding operation. The NC-controlled articulated telescopic shaft 35 continuously guides the dressing tool 9 during the grinding according to the diminishing diameter of the grinding worm 8. The pitch of the coils on the grinding worm 8 changes with the diminishing diameter of the grinding worm 8. An NC-control unit corrects at regular intervals the angle of the dressing tool 9 with the grinding worm 8 so that the grinding worm 8 is dressed thereon even with diminishing diameter.

REFERENCE NUMERALS 1 bench
2 machine upright
3 grinding carriage
4 grinding wheel assembly
5 drive motor
6 workpiece/gear
7 hypoid drive
8 grinding worm
9 dressing tool
10 shaft
11 spur gear
12 spur gear
13 spur gear
14 spiral direction differential
15 control unit
16 spur gear
17 spur gear
18 spur gear
19 spur gear
20 telescopic shaft
21 positioning
22 bevel gear
23 bevel gear
24 shaft
25 bevel gear
26 bevel gear
27 swivel axis
28 bevel gear
29 bevel gear
30 shaft
31 spur gear
32 spur gear
33 spur gear
34 shaft 35 articulate telescopic shaft

I claim:

1. A grinding machine for continuous roll grinding of a workpiece being rotatably driven about a workpiece rotational axis by a rotary drive, a grinding worm being rotatably driven and being movable into engagement with said workpiece for achieving said roll grinding, and a device for continuously dressing said grinding worm during said roll grinding, characterized in that a spiral tooth hypoid drive is provided for driving said workpiece; said rotary drive drives, via a gear mechanism, both said grinding worm and said spiral tooth hypoid drive; means is provided for allowing movement of said grinding worm parallel to said workpiece rotational axis and radially toward and away from said workpiece rotational axis independently, and a spiral direction differential is located between said rotary drive and said spiral tooth hypoid drive.

2. A grinding machine for continuous roll grinding of a workpiece being rotatably driven about a workpiece rotational axis by a rotary drive, a grinding worm being rotatably driven and being movable into engagement with said workpiece for achieving said roll grinding, and a device for continuously dressing said grinding worm during said roll grinding, characterized in that a spiral tooth hypoid drive is provided for driving said workpiece; said rotary drive drives, via a gear mechanism, both said grinding worm and said spiral tooth hypoid drive; means is provided for allowing movement of said grinding worm parallel to said workpiece rotational axis and radially toward and away from said workpiece rotational axis independently, and a spiral direction differential is located between said rotary drive and said spiral tooth hypoid drive and is controlled by an NC-control unit.

* * * * *